US008667566B2

(12) United States Patent
Lazar et al.

(10) Patent No.: US 8,667,566 B2
(45) Date of Patent: Mar. 4, 2014

(54) AUDIO BASED HUMAN-INTERACTION PROOF

(75) Inventors: Jonathan Lazar, Columbia, MD (US); Timothy I. Brooks, Laurel, MD (US); Genna Melamed, Resiterstown, MD (US); Jonathan D. Holman, Towson, MD (US); Junjuan Feng, Ellicott City, MD (US)

(73) Assignee: Towson University, Towson, MD (US)

( * ) Notice: Subject to any disclaimer, the term of this patent is extended or adjusted under 35 U.S.C. 154(b) by 21 days.

(21) Appl. No.: 13/308,011

(22) Filed: Nov. 30, 2011

(65) Prior Publication Data

US 2012/0144455 A1    Jun. 7, 2012

Related U.S. Application Data

(60) Provisional application No. 61/418,025, filed on Nov. 30, 2010.

(51) Int. Cl.
*G06F 21/10* (2013.01)

(52) U.S. Cl.
USPC .................................. 726/4; 726/21; 726/27

(58) Field of Classification Search
None
See application file for complete search history.

(56) References Cited

U.S. PATENT DOCUMENTS

| | | | |
|---|---|---|---|
| 7,565,330 B2 | 7/2009 | Steeves et al. | |
| 7,603,343 B2 | 10/2009 | von Ahn Arellano et al. | |
| 7,890,857 B1 | 2/2011 | Jouppi | |
| 7,975,150 B1 | 7/2011 | Lillibridge et al. | |
| 8,036,902 B1 * | 10/2011 | Strom et al. | 704/275 |
| 8,245,277 B2 | 8/2012 | Lazar et al. | |
| 8,296,659 B1 * | 10/2012 | Antypas, III | 715/741 |
| 8,505,071 B2 * | 8/2013 | Fritz et al. | 726/3 |
| 2005/0014118 A1 | 1/2005 | von Ahn Arellano et al. | |
| 2006/0179053 A1 | 8/2006 | von Ahn Arellano et al. | |

(Continued)

FOREIGN PATENT DOCUMENTS

| | | |
|---|---|---|
| WO | 2005005004 A1 | 1/2005 |
| WO | 2008091675 A1 | 7/2008 |

OTHER PUBLICATIONS

Haichang Gao; Honggang Liu; Dan Yao; Xiyang Liu; Aickelin, U., "An Audio CAPTCHA to Distinguish Humans from Computers," Electronic Commerce and Security (ISECS), 2010 Third International Symposium on , vol., No., pp. 265,269, Jul. 29-31, 2010 doi: 10.1109/ISECS.2010.65.*

(Continued)

*Primary Examiner* — Luu Pham
*Assistant Examiner* — Vu V Tran
(74) *Attorney, Agent, or Firm* — Whiteford, Taylor & Preston, LLP; Joseph L. Morales

(57) ABSTRACT

A method and system for allowing access to computer functions such as websites that utilizes a user's ability to recognize sounds is described. The method presents a user a series of sounds. Some of the sounds presented in the series are labeled as validation sounds. The user is asked to provide an input every time he or she hears the validation sound. The user must identify the sound within a specified length of time. The system disclosed comprises a user interface, a sound database module, a generation module, and a sound database module. The generation module creates the validation test file and expected answer. The answer confirmation module checks the input from the requesting computer and provides access to the computer function if the computer input from the requesting computer meets the required parameters.

11 Claims, 4 Drawing Sheets

(56) References Cited

U.S. PATENT DOCUMENTS

| | | | |
|---|---|---|---|
| 2009/0113294 | A1 | 4/2009 | Sanghavi et al. |
| 2009/0138723 | A1 | 5/2009 | Nyang et al. |
| 2009/0235327 | A1 | 9/2009 | Jakobsson et al. |
| 2009/0319270 | A1* | 12/2009 | Gross .................. 704/246 |
| 2010/0031330 | A1 | 2/2010 | Von Ahn et al. |
| 2010/0049526 | A1 | 2/2010 | Lewis et al. |
| 2010/0251336 | A1* | 9/2010 | Allen et al. .................. 726/4 |
| 2012/0004914 | A1* | 1/2012 | Strom et al. .................. 704/246 |
| 2012/0084450 | A1* | 4/2012 | Nagamati et al. .............. 709/229 |
| 2012/0090028 | A1* | 4/2012 | Lapsley et al. .................. 726/22 |
| 2012/0116896 | A1* | 5/2012 | Holloway et al. .......... 705/14.73 |
| 2013/0014235 | A1* | 1/2013 | Antypas, III .................. 726/5 |

OTHER PUBLICATIONS

Larson et al. Designing Human Friendly Interaction Proofs; Apr. 2005.*

T. Schluessler, S. Goglin, & E. Johnson. "Is a Bot at the Controls? Detecting Input Data Attacks." Proceedings of the 6th ACM SIGCOMM Workshop on Network and System Support for Games, Netgames '07, Sep. 19-20, 2007, Melbourne, Australia.

K. Chellapilla, K. Larson, P. Simard & M. Czerwinski. "Designing Human Friendly Human Interaction Proofs (HIPs)." Proceedings of the SIGCHI Conference on Human Factors in Computing Systems, CHI 2005, Apr. 2-7, 2005, Portland, Oregon, US.

L Von Ahn, M. Blum & J. Langford. "Telling Humans and Computers Apart Automatically." Comm. of the ACM, Feb. 2004. vol. 47, No. 2. pp. 57-60.

J. Holman, J. Lazar, J. Feng & J. D'Arcy. "Develping Usable CAPTCHAs for Blind Users." Proceedings of the 9th International ACM SIGACCESS Conference on Computers and Accessibility, Assets '07, Oct. 15-17, 2007. Tempe, Arizona, US.

J. Elson, J. Douceur & J. Howell. "Asirra: A CAPTCHA that Exploits Interest-Aligned Manual Image Categorization." Proceedings of the 14th ACM Conference on Computers and Communications Security, CCS '07, Oct. 29-Nov. 2, 2007. Alexandria, VA, US.

R. Datta, J. Li & J. Wang. "Imagination: A Robust Image-Based CAPTCHA Generation System." Proceedings of the 13th Annual ACM International Conference on Multimedia, MM '05, Nov. 6-11, 2005. Singapore.

G. Morri & J. Malik. "Recognizing Objects in Adversarial Clutter: Breaking a Visual CAPTCHA." Computer Vision and Pattern Recognition. 2003.

A. Schlaikjer. "A Dual-Use Speech CAPTCHA: Aiding Visually Impaired Web Users while Providing Transcriptions of Audio Streams." CMU-LTI-07-014, Language Technologies Institute, School of Computer Science, Carnegie Mellon University, Nov. 2007, Pittsburgh, PA, US.

ReCAPTCHA: Stop Spam, Read Books. http://recaptcha.net, accessed May 7, 2008.

J'Darcy & J. Feng. "Investigating Security-Related Behaviors Among Computer Users with Motor Impairments." Poster Abstracts of Soups 06, available via http://cups.cs.cmu.edu/soups/2006/posters/darcy-poster_abstract.pdf, accessed Mar. 10, 2007.

J. Johnston, J. Eloff & L. Labuschange. "Security and Human Computer Interfaces." Computers & Security. 22(8), pp. 675-684, 2003.

S. Robinson. "Human or Computer? Take This Test." The New York Times. Dec. 10, 2002. Available via http://query.nytimes.com/gst/fullpage.html?res=9907E5DF163AF933A25751C1A9649C8B63.

M. Sasse, S. Brostoff & D. Weirich. "Transforing the 'Weakest Link'—A Human/Computer Interaction Approach to Usable and Effective Security." BT Technology Journal, 19(3): pp. 122-130, Jul. 2001.

L. Von Ahn, M. Blum, N. Hopper & J. Langford. "Captcha: Using Hard AI Problems for Security." Available via http://www.cs.cmu.edu/biglou/captcha_crypt.pdf, accessed Apr. 3, 2007.

World Wide Web Consortium (W3C). "Inaccessibility of CAPTCHA: Alternative to Visual Turing Tests on the Web." W3C Working Group Note, available via http://www.w3.org/TR/turngtest/ Nov. 23, 2005.

J. Yan & A. EL Ahmand. "A Low-Cost Attack on a Microsoft CAPTCHA." School of Computing Science, Newcastle University, UK, available via http://homepages.cs.ncl.ac.uk/jeff.yan/msn_draft.pdf, accessed Jun. 2, 2008.

CAPTCHA.Net, "CAPTCHA: Telling Humans and Computers Apart Automatically." Retrieved on Jun. 7, 2007 from www.captcha.net.

* cited by examiner

AUDIO BASED HUMAN-INTERACTION PROOF

CROSS REFERENCE TO RELATED APPLICATIONS

The present application claims priority under 35 U.S.C. §119 to U.S. Provisional Application Ser. No. 61/418,025 filed on Nov. 30, 2011, entitled "Audio Based Universally Usable Human Interaction Proof," which is incorporated herein by reference in its entirety.

BACKGROUND

1. Field of the Invention

The present invention relates to the field of data processing and information security. More specifically, the invention relates to a method for allowing visually impaired individuals to access secured websites or computer functions designed to require a human person to enter information and, at the same time, prevent automated systems to access the website or computer function.

2. Background

Current audio based Completely Automated Public Turing Test to Tell Computers and Humans Apart ("CAPTCHA") challenges are difficult to answer correctly. Users are played a sound bite of recorded but distorted speech and asked to type in what the user heard. The existing audio CAPTCHA validation tests are difficult to use and have a very low success rate. For example, it has been reported that the most popular version of audio validation tests (i.e., GOOGLE's reCAPTCHA) has a user success rate of no more than 46%. Because audio based CAPTCHAs are the only viable alternative for visually impaired users, and CAPTCHA challenges are used to protect many commercial websites, the difficult use and low success rate for visually impaired users represent a significant problem for that user community.

In addition, the sound bites for some audio CAPTCHAs are drawn from recordings of old radio broadcasts (e.g., GREEN HORNET, THE LONE RANGER, etc.) and are in English. There is no corresponding large base of audio material in other languages, limiting the usefulness of currently available audio CAPTCHAs. Furthermore, the standard visual based CAPTCHA challenges are susceptible to being solved by computers using various forms of analysis. Research has found that the challenges can be solved by computers 20% to 30% of the time.

SUMMARY OF THE INVENTION

Disclosed is a system and method for authorizing access to a computer function, such as a website, utilizing a sound validation test. In a first step of the method, an application receives a request to access a computer function from a requesting computer. A validation test file is generated that includes both a series of sounds presented at various intervals and an expected response. At least one of the sounds in the series of sounds is a validation sound. The validation test is then presented to the requesting computer. In a further step, an input from the requesting computer is collected. The input from the requesting computer and the expected response are then compared to determine whether the two match. If the input matches the expected response, the requesting computer is allowed access to the computer function.

A system in accordance with one embodiment of the present invention is also described in which the system comprises a user interface, a validation test generation module, an answer confirmation module, and a sound database module. The system is preferably connected to the requesting computers through a computer network. The user interface in the system may be configured to manage the communications between the requesting computer and the system's modules.

BRIEF DESCRIPTION OF THE DRAWINGS

The above and other features, aspects, and advantages of the present invention are considered in more detail in relation to the following description of embodiments thereof shown in the accompanying drawings, in which.

DETAILED DESCRIPTION

Figure 1:
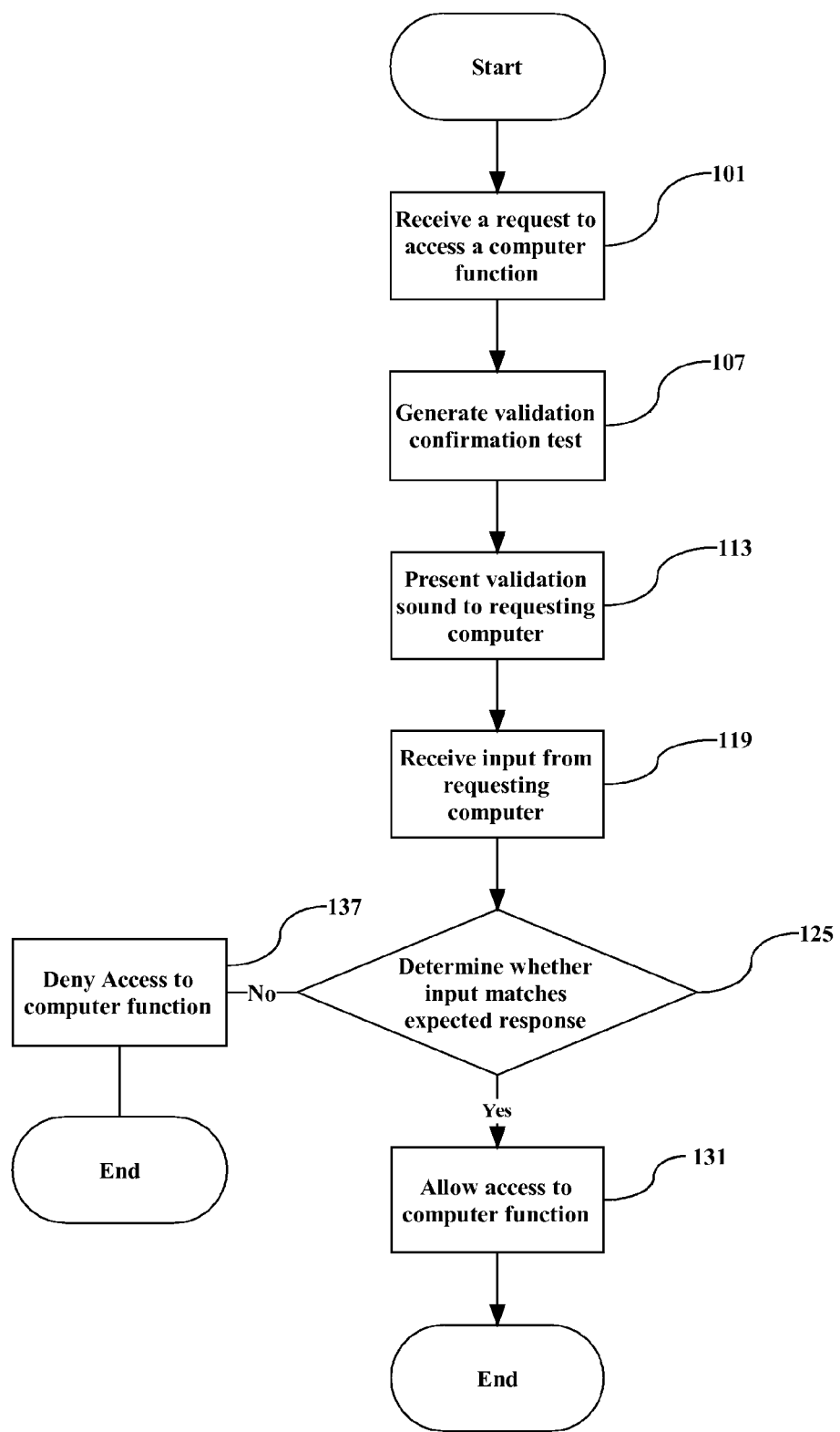
FIG. 1 is a flowchart illustrating a computer implemented method to authorize access to a computer function in accordance with certain aspects of a preferred embodiment of the present invention.

The invention summarized above may be better understood by referring to the following description and claims, which should be read in conjunction with the accompanying drawings in which like reference numerals are used for like parts and steps. The following description is of a particular embodiment of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Disclosed is a computer-implemented system and method that presents CAPTCHA challenges in a real-time format. This allows the development of a usable audio based CAPTCHA challenge or validation test. The real-time presentation allows a simple audio based task with a high success rate while complicating the use of established methods used to circumvent CAPTCHA challenges by denying the intruders the time needed to analyze the task.

In accordance with a particularly preferred embodiment, a computer implemented method to authorize access to a computer function is shown in FIG. 1. In step 101, an application managing access to the computer function receives a request to access the computer function from a requesting computer. The application managing access to the computer function is a computer program or a computer configured to carry out the method for authorizing access to a computer function as described herein. As used in this description, a computer function means any type of computer process. Some examples of computer functions include access to a particular website, access to a mobile device, access to a computer program, access to a processor, execution of a particular program or any other type of action that a user may require a computer to conduct. It is contemplated that the application managing access to the computer function may run on the computer where the function is to be conducted or a remote computer. The requesting computer and the application managing access to the computer function may be on the same machine or merely different applications within the same structure or separate computers all together.

At step 107, the application managing access to the computer function generates a validation test and an expected response. In one preferred embodiment, the validation test and expected response are generated as explained in more detail below in association with FIG. 2. The validation test comprises a series of sounds presented at various intervals. At least one sound in the series of sounds is a validation sound (which is also referred to herein as the "target sound"). When a user hears the validation sound, he or she can strike a key on a keyboard or touch a screen to signal that the user has heard the sound. In a further exemplary embodiment, the validation test is thirty four seconds in length. The validation test is comprised of 10 individual sound spots each separated by a brief period of silence and an audio delimiter in the form or a spoken phrase, such as "next sound". This particular embodiment, allows the user to decide whether one specific sound spot corresponds to the target sound or not. The delimiter prompts the user to listen for the sound and make a decision. In some alternative embodiments, no delimiter is provided and the user provides an input when the user hears the target sound.

In one exemplary non-limiting example, each sound bite is 3 seconds in length. It comprises the sound and a period of silence, which combined last 2 seconds and the delimiter lasts 1 second. The total ten sounds last 30 seconds. The generation of the validation test and evaluation of the responses takes 4 seconds for a total of 34 seconds. The validation test requires that the entire 30 seconds be played, reducing the risk of intrusion by BOTs or human interaction. It is contemplated that the number of sound spots, length of each spot, and total length of the validation test can be adapted to the requirements of the computer function being protected, and the level of security desired by the administrator of the computer function.

At step 113, the validation test is presented to the requesting computer. In some embodiments, the validation test is executed at the requesting computer. Alternatively, the validation test may be executed at computer hosting the application managing access to the computer function and only the test sounds are transmitted to the requesting computer for identification by the user.

Once the requesting computer presents a user with the validation test, the requesting computer receives the responses to the validation test and transmits the validation responses to the application managing access to the computer function at step 119. As explained above, in certain embodiments the input consists of the user pressing a key on a keyboard. In one preferred embodiment, the key is any key on the keyboard. In other embodiments, the key input is a specific key on the keyboard such as a space key or the enter key. In yet a further embodiment of the present invention, the input is a click of a mouse or the touch signal from a touchscreen in a mobile device, tablet computer, or any other type of input that the user utilizes to indicate to the requesting computer that the user has identified a validation sound.

After the input has been collected from the user, the requesting computer transmits the input to the application managing access to the computer function and the application determines whether the input matches the expected response in step 125. The expected response corresponds to a number of inputs within specified time periods based on the number of validation sounds presented in the validation test. If the input matches the expected response, the application allows access to the computer function in step 131. If the input does not match the expected response, the application managing access denies further access to the computer function in step 137. In one exemplary embodiment, the above method is provided when a user of a website, which in this case is the computer function, wishes to access an area of the site that the website operator intends to keep from being accessed by BOTs or other automated website penetration tools. Before being allowed into such website, the user is given a validation test that asks the user to identify a given sound in a series of sounds. A screen is preferably initially presented to the user that explains the challenge and instructs the user to press the space bar or any other designated key each time the user hears a target sound. For example, the user is asked to press a key each time he or she hears the sound of a bell ringing. The user is then instructed to click on a button (or press the space bar) to begin the validation test or challenge. In one exemplary embodiment, a series of sounds is presented to the user, some (varying) number of which would be the target or validation sound of a bell or other sound easily recognizable by the user. The user then has the opportunity to respond (e.g., press a key, etc.) each time the user hears the target sound and be allowed to enter the website if the user correctly identifies all of the target sounds. Because this method eliminates the need for text entry, and is essentially language and literacy independent, it significantly simplifies the task for the responder. It also eliminates the need for evaluating responses against a list of equivalent terms (e.g., dog=puppy=pooch=hound, etc.).

Figure 2:
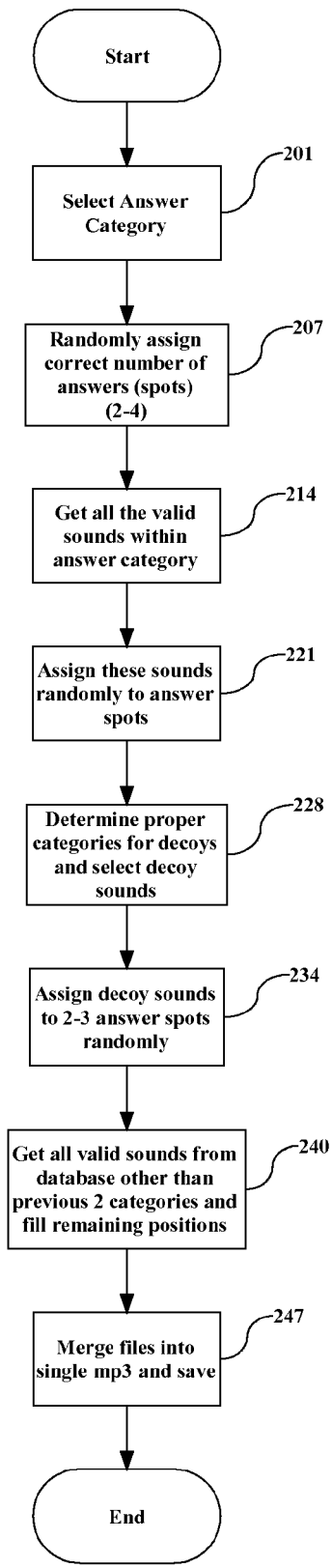
FIG. 2 is a flowchart illustrating a method for generating a validation test in accordance with further aspects of a preferred embodiment of the present invention.

The validation test is generated as shown in FIG. 2, in accordance with further aspects of an embodiment of the invention. More particularly, the validation test (or challenge) presented to a user comprises preferably a low resolution audio file, preferably in MP3 format. A person of ordinary skill in the art, however, will appreciate that other audio formats can be used for the validation. The method for creating a validation test begins at step 201 where an application managing access to the computer function selects an answer category from a database of sounds arranged by categories. There may be numerous entries or sounds in each category. Categories preferably include sounds like "bells," "dog barks," "babies crying," and other distinctive sounds that a user is able to easily recognize. In order to generate a challenge or validation file, the application selects a type of sound that will be the target or validation sound from the selected category. For example, the application may select a sound labeled "bells" that the user is asked to identify. The application then, in step 207, preferably randomly sets a number of target positions for the audio file, preferably between 2 and 4. Optionally, the number of positions may be predetermined instead of randomly selected. It is contemplated that the application may select as many spots as required for secured authentication. A person of ordinary skill in the art would recognize that an increased number of spots results in increased security, but also an increase in the demand on resources in the system and an increase in the required interaction with the user. In the next step 214, the application selects the validation sounds from the selected answer category. The application may select one sound from the category to be used one or more times as a validation sound or, alternatively, the application may select various sounds within the category to fill the validation spots. For example, where the validation sound is a bell, the application may select one particular bell sound to be used in the various spots. Alternatively, the application may select various different types of bell sounds as the validation sound. The application at step 221 preferably randomly assigns audio clips from the target category to the target positions in the audio file.

Each category of validation sounds preferably has an associated list of appropriate categories from which to draw decoy sounds (also referred to herein as non-validation sounds). The list of appropriate sounds and its correlation with the validation sound selected ensures that the decoy sounds are not too similar to the target sounds, which could cause confusion to the user. In addition, logic is implemented to ensure that the target category is not the only category in the audio file with more than one position. At step 228, the application determines the appropriate decoy sounds to be used in association with the validation sounds. The application is programmed to ensure that the decoy sounds are sufficiently different from the validation sounds as to avoid user confusion. For example, the application may be programmed to ensure that a bell sound does not conflict with a hammer banging on metal sound. The application then selects the decoy sounds to be utilized in the validation test. At step 234 the decoy sounds are assigned to the remaining positions in the audio file, i.e., those positions not assigned to a validation sound.

The application may also obtain additional validation sounds from other categories not previously selected and assigns them to any unfilled positions in step 240.

Last, at step 247 the application preferably merges all of the selected sound clips into a single file, e.g., an MP3 file that is played at the requesting computer or browser. It is contemplated that the audio file can be in any format that allows the file to be played on a computer or electronic device in association with the validation test described in herein. The validation test file (comprising the target or validation sounds and decoy sounds) may be produced on demand from a database of individual audio clips.

The audio file is preferably 30 seconds in length, conceptually divided into 102.5 second segments, although alternative sound segment lengths may likewise be employed without departing from the spirit and scope of the invention. Each segment preferably contains a two second audio clip and a half second of silence. Preferably between two and four of the positions contain target sounds and the rest of the positions are filled with decoy sounds. It is contemplated that in some embodiments, the length of time for each sound varies.

Figure 3:
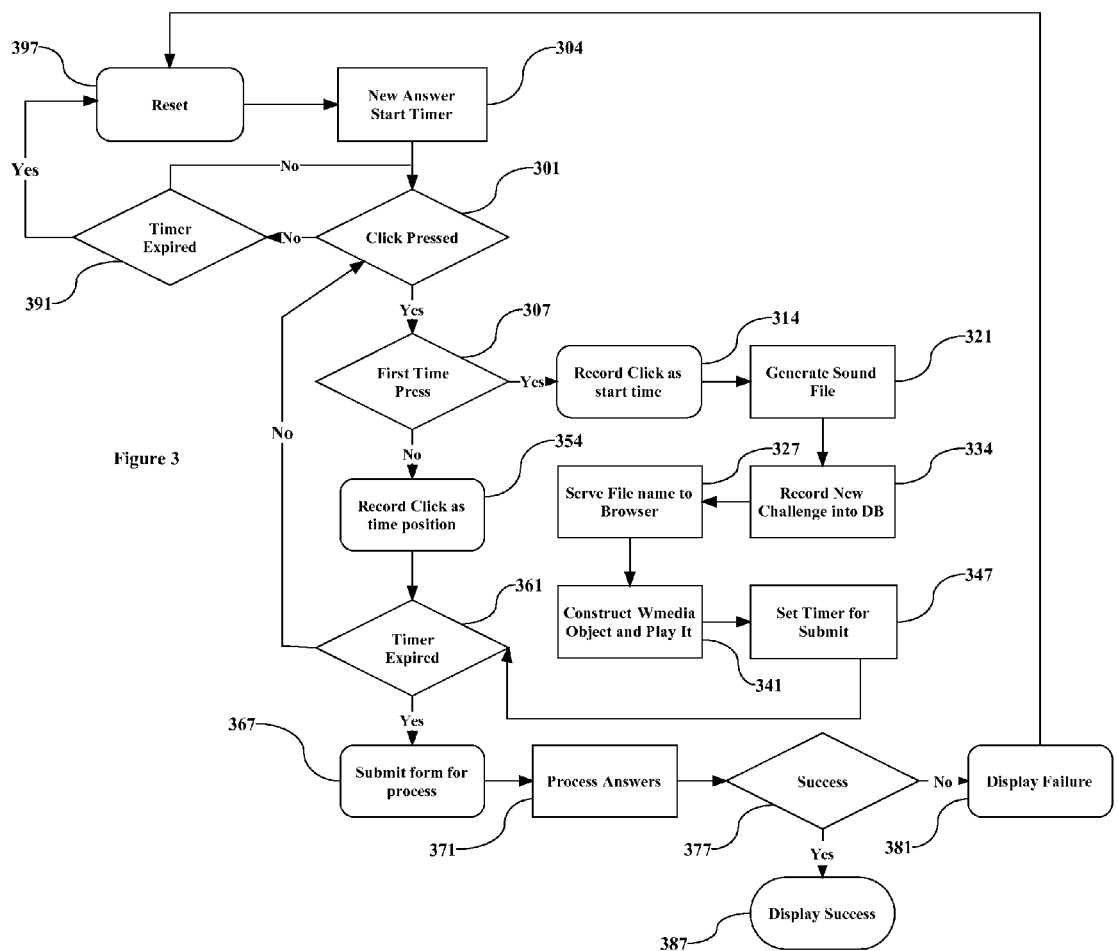
FIG. 3 is a flowchart illustrating the input recognition sequence for the validation test in accordance with still further aspects of an embodiment of the present invention.

Further aspects of a method for authorizing access to a computer function in accordance with an embodiment of the invention are shown in the flow chart of FIG. 3. In step 301 the computer function, such as a website, is presented to a user by a requesting computer. The user then requests access to the computer function by clicking on a particular portion of the screen presented by the requesting computer or selecting a particular option presented to a visually impaired individual. The application records an input, such as a click on a particular screen or the use of a particular key or mouse input. After the application receives the input it determines whether that is the first input in response to a request to authorize access at step 307. If it is the first time the input has been registered, the application records that particular input as the first input to start the time sequence for the authorization validation test. The application at step 321 generates a sound file containing the validation test. In step 334 the validation test is recorded on a validation database. In one particular embodiment, the file name of the sound file is presented to the browser being used to request access at step 327, and at step 341 the audio file is constructed and played on the browser for the individual user to identify the validation sounds produced in the recording. At step 347 the application sets the timer that is utilized to validate the answers to the authorization validation test. At step 361 the application determines whether the expected time has expired. If the time has not expired, the application goes back to step 301 and determines if an input has been received. If the input has been received the application checks whether it is the first input at step 307. If it is not the first input, the application records the time position for that particular input at step 354. Again the application determines whether the time has expired at step 361. If the time has not expired, the cycle continues until the time expires. Once the time for input expires, the times of the inputs are submitted for processing at step 367. The answers are then processed at step 371 where the times at which the inputs were made is compared with the times expected in accordance with the generated sound recording. The application then at step 377 evaluates whether the access should be granted. If the inputs are valid, then at step 387 the requesting computer is allowed access to the computer function. For example, the secured website is displayed on the requesting computer's browser.

If the inputs do not meet the expected results, at step 381 a failure notification is displayed on the requesting computer and the system is reset at step 397. In alternative embodiments, the failure notification includes an audio message that alerts a visually impaired user that the test has failed. At that point the application develops a new answer set in step 304 and the new validation test is presented to the requesting computer. Similarly, if no input is received at step 391 the application determines if the timer has expired. If it has not expired, the test will continue to step 301. If the time has expired without input, the system is reset at step 397 and a new validation is presented in step 304.

When the user initiates the challenge, a series of a fixed number of recorded sounds (e.g., ten sounds), each of relatively short duration (e.g., two seconds in length) with a smaller break in between each of the record sounds (e.g., one half of a second in length), are played for the user. Between one and four of the sounds are examples of the target sound, e.g., a bell. In order to successfully pass the challenge, the user must press the space bar (or other designated key) in response to the target sounds. The application records the timing of the key presses and, when the sound series is complete, submits the response to the server for analysis. The application preferably examines the timing of the key presses and determines if the key press occurred while the target sound was playing. If there is a single key press recorded for each and every instance of the target sound, the application considers the challenge to be correctly answered and sends a tokenized response to the web server that then allows the user to proceed into the website.

In some preferred embodiments of the present invention, the application is preferably configured to not accept a response that has not allowed enough time (e.g., 24 seconds) for the sound series to play completely, under the assumption that this is a guess rather than a real response. This serves as a deterrent to distributed "brute force" attacks because an automated process would have no significant speed advantage over an individual user. The application will also preferably reject any response that takes more than the allotted time. This denies intruders the ability to proxy the challenge to a human to solve on behalf of the BOT. Because massive (i.e., brute force) guessing and proxy are the most widely used techniques for circumventing CAPTCHAs, these benefits of the real-time approach used by the system and method described herein are significant.

Figure 4:
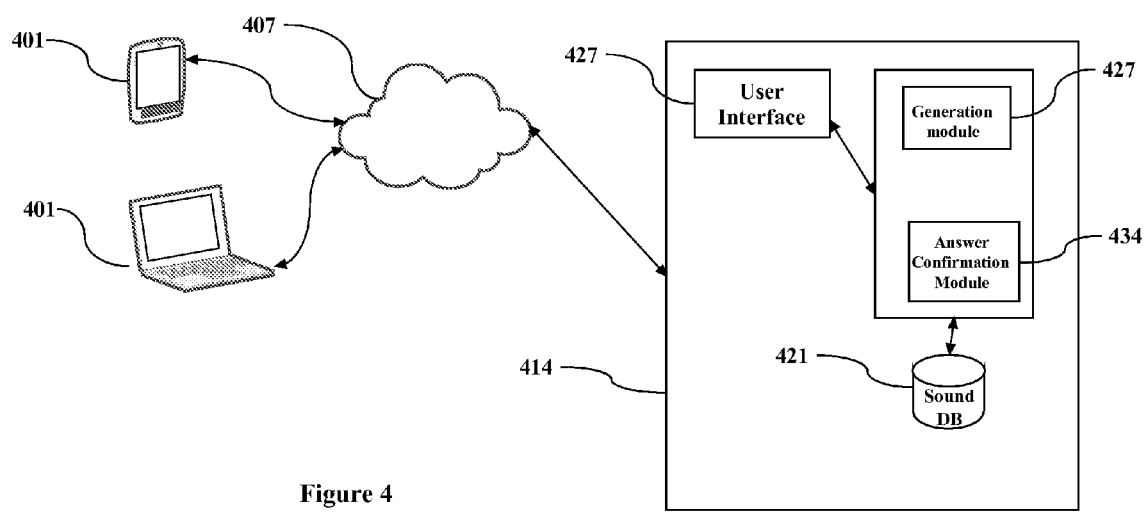
FIG. 4 is a graphical representation of a system suitable for use with the methods of FIGS. 1-3.

With regard to still further aspects of an embodiment of the present invention, a system for authorizing access to a computer function is provided as shown on FIG. 4. An exemplary computer network configuration suitable for implementing the computer implemented method to authorize access to a computer function is described herein. It is noted, however, that such system is exemplary only, and that the components, process steps, and/or data structures may be implemented using various types of operating systems, computing platforms, computer programs, and/or general purpose machines. In addition, those of ordinary skill in the art will recognize that devices of a less general purpose nature, such as hardwire devices, field programmable gate arrays, application specific integrated circuits, or the like, may also be used without departing from the spirit and scope of the present invention.

The system 414 for implementing a computer implemented method to authorize access to a computer function is connected to one or more user client devices 401 (requesting computers) through a computer network 407, such as a wide area network (e.g., the Internet). The system 414 is configured to generate validation tests based on validation sounds. The validation test allows a requesting computer 401 to access a computer function, e.g., a website, based on the response from a user utilizing the requesting computer 401.

In one preferred embodiment, the system 414 includes a user interface module 427, a validation test generation module 427, an answer confirmation module 434, and a sound database module 421. The user interface 427 preferably provides a connection to the requesting computer 401. The user interface 427 further facilitates communications between the requesting computer 401 and the system 414. In one preferred embodiment, the user interface 427 receives the request for access to a computer function from the requesting computer 401. The user interface 427 then manages the communications between the system 414 and the requesting computer 401 through the computer network 407. The user interface 427 sends the validation test to the requesting computer 401. In some preferred embodiments the validation test is sent to the requesting computer for execution. Alternatively, the sounds from the validation test may be provided to the requesting computer 401 from the user interface 427 through the computer network 407. The generation module 427 prepares the validation test as described above, selecting validation and decoy sounds from the sound database module 421. The answer confirmation module compares the inputs from the requesting computer 401 and the expected inputs from the validation test file. If the inputs are within the parameters of the validation test, the requesting computer is authorized access to the computer function. If the inputs are not within the parameters of the validation test, the requesting computer is not allowed access to the computer function.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A computer implemented method to authorize access to a computer function, comprising:
   receiving a request to access a computer function from a user interface;
   generating a Completely Automated Public Turing Test to Tell Computers and Humans Apart ("CAPTCHA"), wherein the CAPTCHA comprises:
      randomly selecting a sound category to be used as a validation sound, selecting a plurality of non-validation sounds,
      assembling a series of sounds that includes i) at least two validation sounds from the category of validation sounds, and ii) the plurality of non-validation sounds;
      establishing a time duration for the CAPTCHA,
      determining expected time intervals between the first validation sound and
      subsequent validation sounds;
   presenting said CAPTCHA through the user interface;
   recording a first input in response to a first validation sound and starting a timer for evaluating inputs;
   recording subsequent inputs during the test until expiration of the time duration of the CAPTCHA,
   determining time intervals between the first input and the subsequent inputs; and
   allowing access to the computer function if the time intervals between the first input and the subsequent inputs correspond to the expected time intervals.

2. The method of claim 1, wherein the input corresponds to one key stroke recorded within a specified period of time after a validation sound is presented.

3. The method of claim 2, wherein a key stroke is selected from the group consisting of a keyboard entry, a tap on touch screen, and a mouse click.

4. The method of claim 1, wherein said user interface is in a device selected from the group consisting of a mobile device, a mobile application, a telecommunications device, and a personal computer station.

5. The method of claim 1, wherein said generating step comprises transmitting said CAPTCHA to a requesting computer for execution at the requesting computer.

6. The method of claim 1, wherein said generating step comprises presenting the CAPTCHA to a requesting computer where the CAPTCHA is executed at a second computer.

7. The method of claim 1, wherein said computer function is a website.

8. A system for authorizing access to a computer function, comprising:
   a computer including a user interface, a validation test generation module, an answer confirmation module, and a sound database module, wherein said computer is configured to perform the step of:
   receiving a request to access a computer function from the user interface
   generating a Completely Automated Public Turing Test to Tell Computers and Humans Apart ("CAPTCHA"), wherein the CAPTCHA comprises:
      randomly selecting a sound category to be used as a validation sound, selecting a plurality of non-validation sounds,
      assembling a series of sounds that includes i) at least two validation sounds from the category of validation sounds, and ii) the plurality of non-validation sounds;
      establishing a time duration for the CAPTCHA,
      determining expected time intervals between the first validation sound and
      subsequent validation sounds;
   presenting said CAPTCHA through the user interface;
   recording a first input in response to a first validation sound and starting a timer for evaluating inputs;
   recording subsequent inputs during the test until expiration of the time duration of the CAPTCHA,
   determining time intervals between the first input and the subsequent inputs; and
   allowing access to the computer function if the time intervals between the first input and the subsequent inputs correspond to the expected time intervals.

9. The system of claim 8, further comprising a sound database module comprising sound bites to be used by the validation test generation module.

10. The system of claim 9, wherein the sound bites are arranged by category.

11. The system of claim 8, wherein the system is connected to a computer network.

\* \* \* \* \*